United States Patent [19]

Holecek et al.

[11] 4,226,570
[45] Oct. 7, 1980

[54] BLOCKER FOR MAGNETIC DISKETTE GRIPPER

[75] Inventors: Joseph J. Holecek, Kasson; William B. Plummer, Rochester; Clarence R. Schwieters, Rochester; Michael N. Zell, Rochester, all of Minn.

[73] Assignee: International Business Machines Corporation, Armonk, N.Y.

[21] Appl. No.: 7,133

[22] Filed: Jan. 29, 1979

[51] Int. Cl.³ .............................................. G11B 17/22
[52] U.S. Cl. .................................. 414/751; 414/416; 294/99 R; 360/98
[58] Field of Search ............... 414/416, 749, 751, 753, 414/786; 271/85, 18, 268; 274/9 RA, 10 C, 10 D; 198/486, 650, 695, 746; 294/86 R, 99 R, 103 R; 360/97, 98, 133

[56] References Cited

U.S. PATENT DOCUMENTS

| | | | |
|---|---|---|---|
| 1,839,507 | 1/1932 | Smith | 274/10 C |
| 3,199,653 | 8/1965 | McGowan | 271/85 X |
| 3,960,264 | 6/1976 | Carbine et al. | 414/753 X |
| 4,058,307 | 11/1977 | Bubley et al. | 414/753 X |
| 4,170,030 | 10/1979 | Castrodale et al. | 360/98 |
| 4,170,031 | 10/1979 | Beuch et al. | 360/98 |
| 4,173,427 | 11/1979 | Beuch et al. | 198/486 X |

*Primary Examiner*—Stephen G. Kunin
*Assistant Examiner*—Terrance L. Siemens
*Attorney, Agent, or Firm*—Carl W. Laumann, Jr.; Keith T. Bleuer

[57] ABSTRACT

A clothespin-like gripper having a pair of clamp jaw portions resiliently urged together and adapted to embrace and thereby grip a magnetic diskette or disk-jacket assembly for pulling the diskette from an original position into a final position. A swingable blocker is provided on the gripper so that the diskette is thereby blocked from being embraced by the gripper whereby the gripper may be used to move the diskette back from its final position into its original position without any embracing action by the gripper.

9 Claims, 7 Drawing Figures

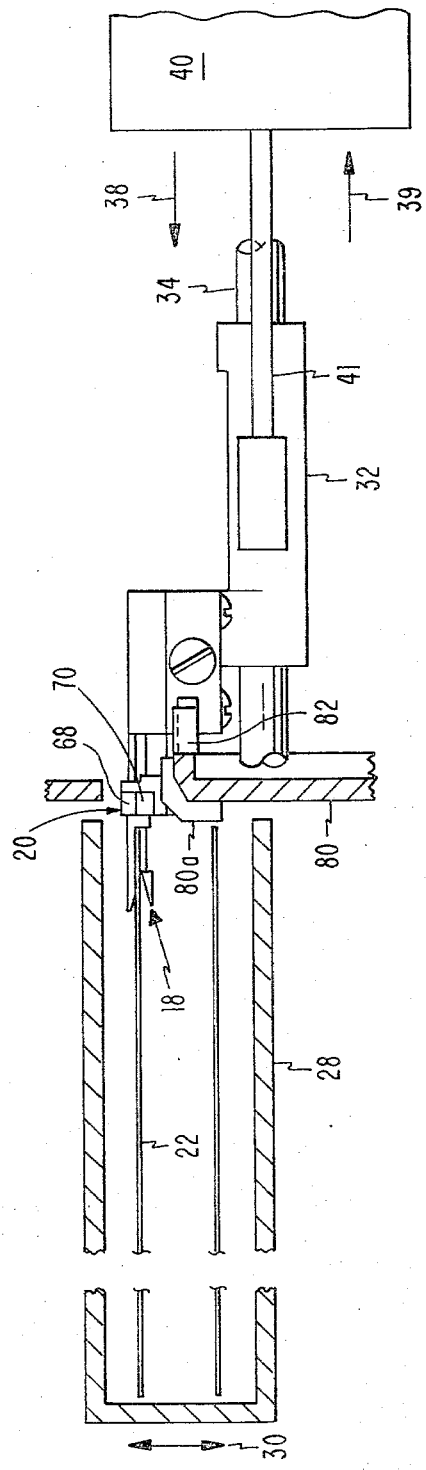
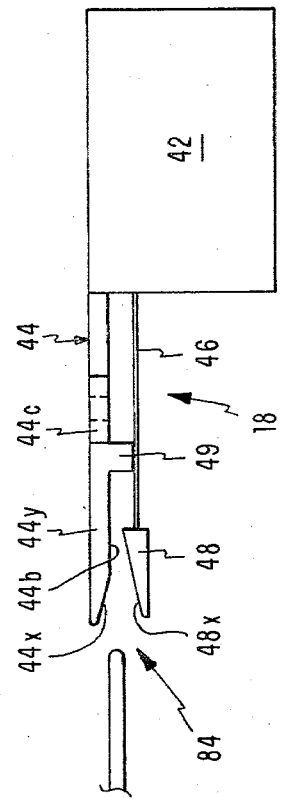
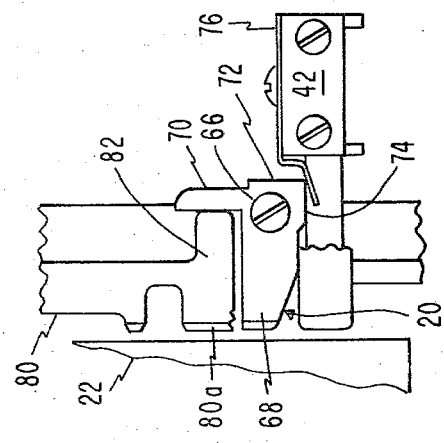

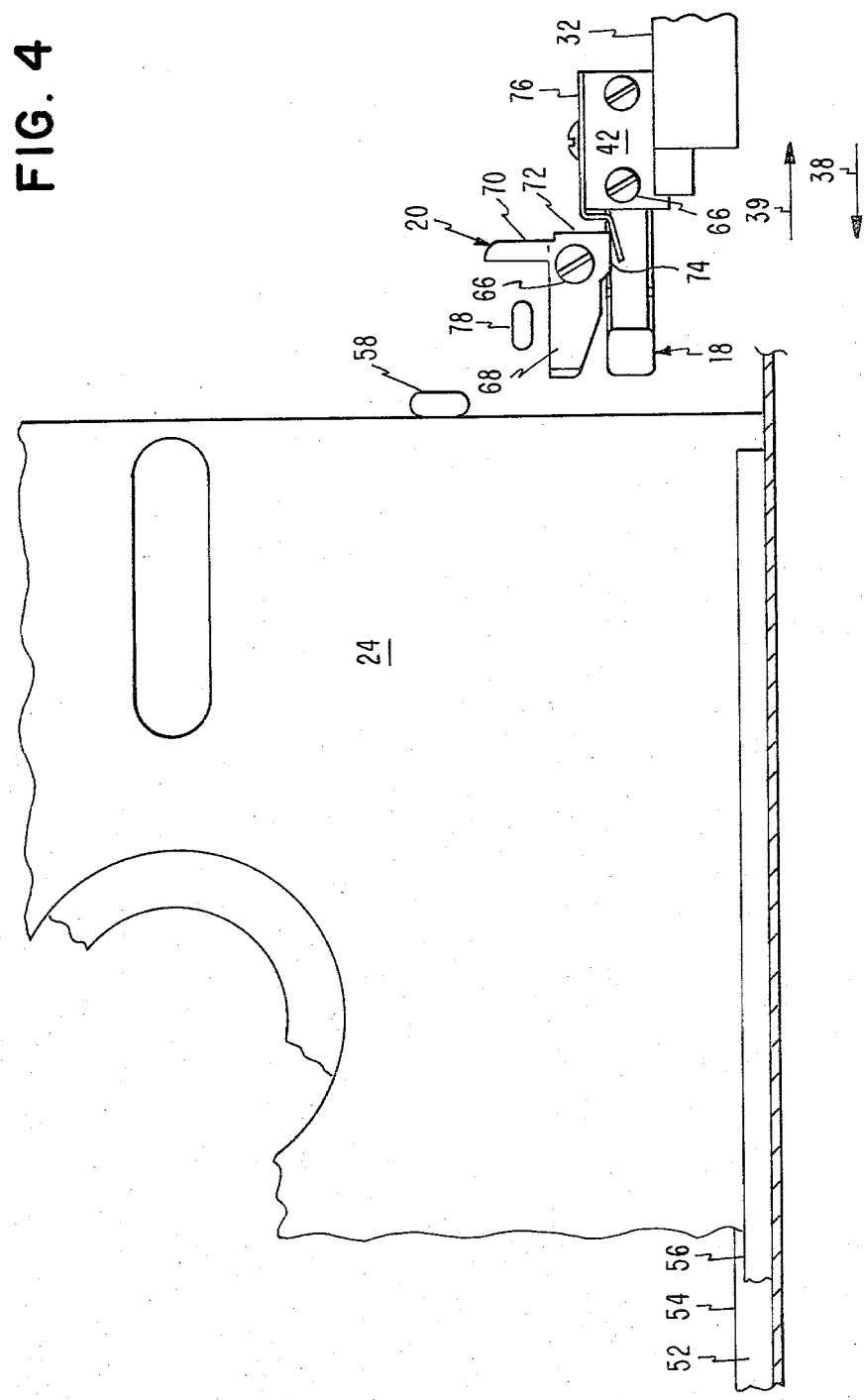

BLOCKER FOR MAGNETIC DISKETTE GRIPPER

CROSS REFERENCES TO RELATED APPLICATIONS

The gripper and its blocker herein described is related to the gripper disclosed in the co-pending application of W. E. Beuch et al, Ser. No. 888,601 filed Mar. 20, 1978 now U.S. Pat. No. 4,173,427, and to the disk file machine disclosed in a patent application by W. E. Beuch et al, Ser. No. 888,603 filed Mar. 20, 1978, now U.S. Pat. No. 4,170,031, and in a patent application by D. O. Castrodale et al, Ser. No. 888,437, filed Mar. 20, 1978, now U.S. Pat. No. 4,170,030.

BACKGROUND OF THE INVENTION

The invention relates to disks containing information on surfaces thereof and more particularly to magnetic diskettes, such as of the type disclosed in U.S. Pat. No. 3,668,658. Still more particularly, the invention relates to clothespin-like grippers or picker devices for use with such diskettes whereby the diskettes may be moved between different positions.

It has been previously proposed in said Beuch et al and Castrodale et al patent applications that a clothespin-like gripper be used in connection with a magnetic diskette for embracing the diskette and pulling the diskette from an original position, such as in a diskette magazine, into a final position in which data transfer may take place with respect to the disk of the diskette. The clothespin-like gripper on a return movement after data transfer has occurred may be used for again embracing the diskette and moving the diskette back into its original position. The gripper may then again be retracted so as to pull off of the diskette, with the diskette being retained in the magazine by selectively controlled motor operated holding mechanism.

SUMMARY OF THE INVENTION

It is an object of the present invention to provide mechanism in connection with such a clothespin-like gripper for preventing entry of the diskette into the gripper on a return movement of the gripper so as to thereby reduce the wear by the gripper on the diskette.

More particularly, it is an object of the invention to provide a movable blocker in connection with the clothespin-like gripper so that, when the blocker is in its blocking position, it prevents entry of the diskette into the clothespin-like gripper, while in its unblocking position it allows such entry.

BRIEF DESCRIPTION OF THE DRAWINGS

FIG. 1 is a top plan view of a diskette gripper and blocker according to the invention connected with and movable by a motor toward diskettes within a diskette magazine, with the gripper being in a so-called "picker extend" position;

FIG. 4 is a side elevational view of the diskette and gripper and blocker in their positions shown in FIG. 3;

FIG. 5, is a fragmentary elevational view of the gripper in a "picker rest" position with the blocker being shown in a corresponding position;

FIG. 6 is a top plan view of the gripper with the blocker being disassembled from the gripper for a clear showing of the gripper.

DESCRIPTION OF THE PREFERRED EMBODIMENT

Figure 2:
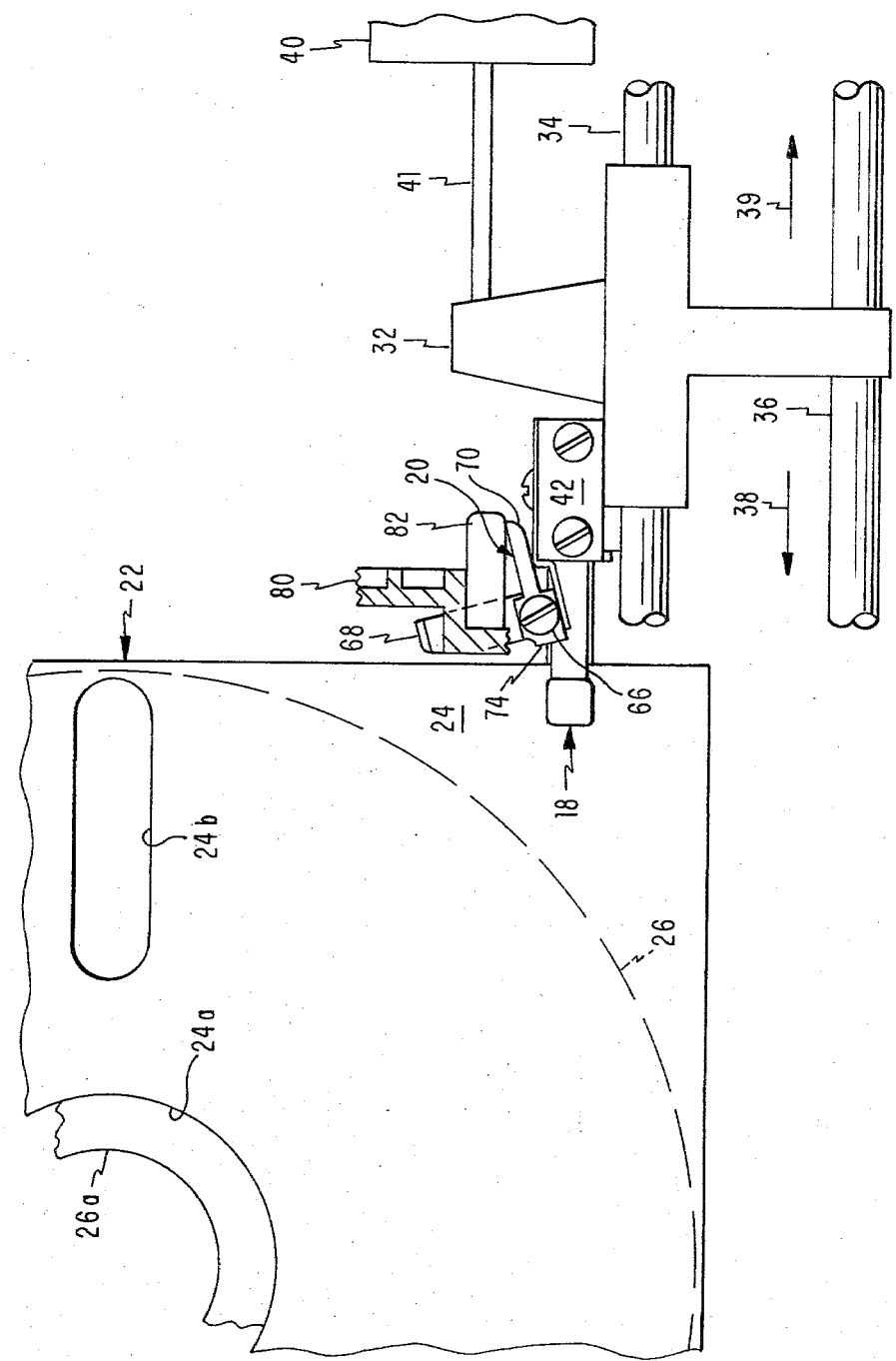
FIG. 2 is a side elevational view of the mechanism as shown in FIG. 1.

The improved picker device or gripper 18 incorporating a pivotal blocker or stripper 20 according to the invention may be used in the diskette moving system illustrated in FIGS. 1 and 2. The system includes a plurality of diskettes 22 which may be of the type disclosed in U.S. Pat. No. 3,668,658 and each of which includes an outer jacket 24 and a magnetic disk 26 of thin flexible material within the jacket 24. The diskettes 22 are initially disposed in a storage magazine 28. The magazine 28 may contain suitable internal ribs and grooves for holding the diskettes 22 separated and may be of the type disclosed in the U.S. patent application of David R. Wilson, Ser. No. 888,435, filed Mar. 20, 1978, now U.S. Pat. No. 4,162,006. The magazine 28 is movable in direction 30 under actuation by any suitable power source. The disk 26 of each of the diskettes 22 has a central opening 26a through it, and the jacket 24 has somewhat larger central openings 24a and elongate openings 24b through its two thicknesses. Suitable magnetic transducers may extend through the openings 24b to thus be in contact with the disk 26 of a diskette 22 as the disk rotates for data transferring action when the diskette is in a data transferring position at least partially withdrawn from the magazine 28.

The gripper 18 is fixed on a carriage 32 which is slideably disposed on a pair of guide rods 34 and 36. The carriage 32 is movable in directions 38 and 39 by means of a motor 40 connected to the carriage 32 by means of a thrust rod 41.

The gripper 18 is clothespin-like and comprises a base 42 and a pair of opposite arms 44 and 46 fixed with respect to the base 42 (see FIG. 6). The arm 44 is of rigid material. The arm 46 has a tip portion 48 of solid rigid material and, except for its tip portion 48, is leaf spring steel so that the inherent resiliency of the arm 46 swings it toward the arm 44. The arm 44 is provided with a boss portion 49 extending toward the arm 46 and constituting a stop for limiting the swinging movement of the arm 46 toward the arm 44. With no separating force on the arms 44 and 46, the arm 46 contacts the boss portion 49 due to the spring action of the arm 46.

A diskette 22 in alignment with the gripper 18 is adapted to be moved out of the magazine 28 by the gripper 18 into an elongate slot 52 formed by upstanding ribs 54 and 56 (see FIG. 4) which are parallel with the rods 34 and 36. The diskette 22 is disposed in the magazine 28 in a plane parallel with the rods 34 and 36, the ribs 54 and 56 and the arm 44 and has one side surface in particular in the same plane as the internal arm surface 44b as shown in FIG. 6.

Figure 3:
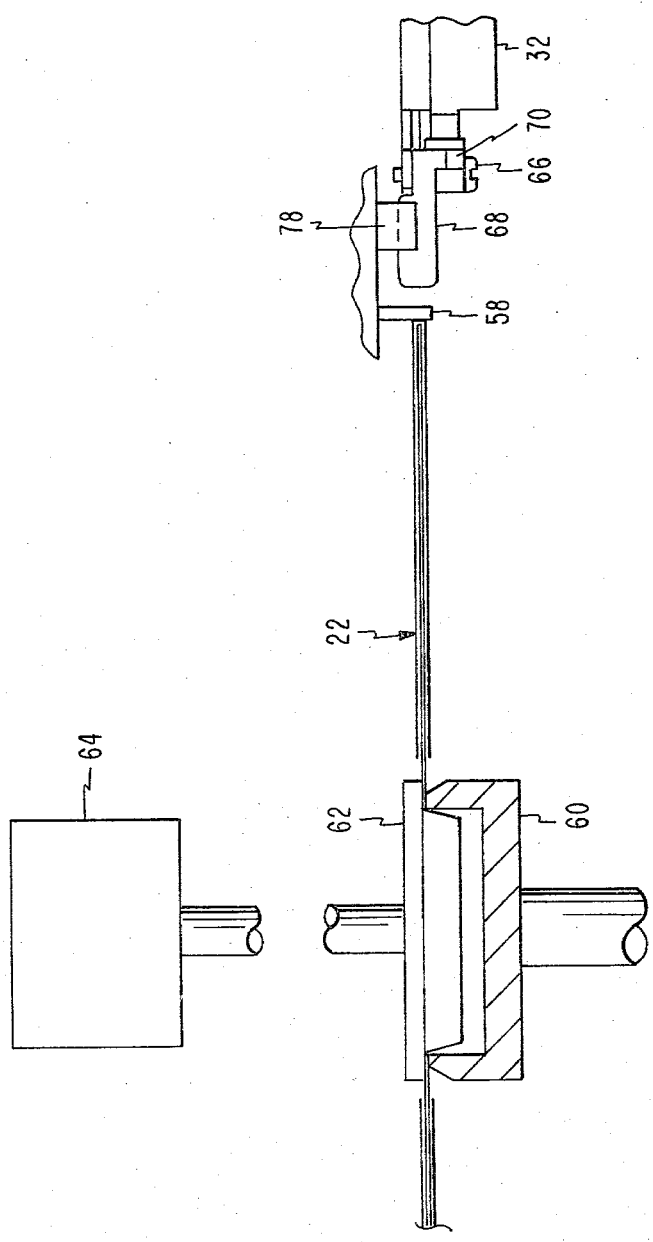
FIG. 3 is a top plan view of a diskette, gripper and blocker in different positions than shown in FIG. 1, with the diskette being in a data transfer position and with the gripper having been drawn off of the diskette into a so-called "diskette in" position.

The gripper 18 moves the diskette 22 in direction 39 into its position as illustrated in FIGS. 3 and 4 which is the data transferring position of the diskette 22 at which transducers may be moved through the jacket openings 24b for data transferring action with respect to the disk 26 of the diskette 22. A fixed stop 58 limits the movement of the diskette 22 in the direction 39; and, in this position, the central opening 26a of the disk 26 is in axial alignment with the longitudinal centers of a drive spindle 60 and a collet 62 (see FIG. 3). The drive spindle 60 is rotatably driven by any suitable power source (not shown), and the collet 62 is adapted to be moved toward the spindle 60 so as to grip the disk 26 between the collet 62 and spindle 60. A motor 64 of any suitable construction is provided for moving the collet 62 toward the spindle 60 for this disk engaging action.

Figure 7:
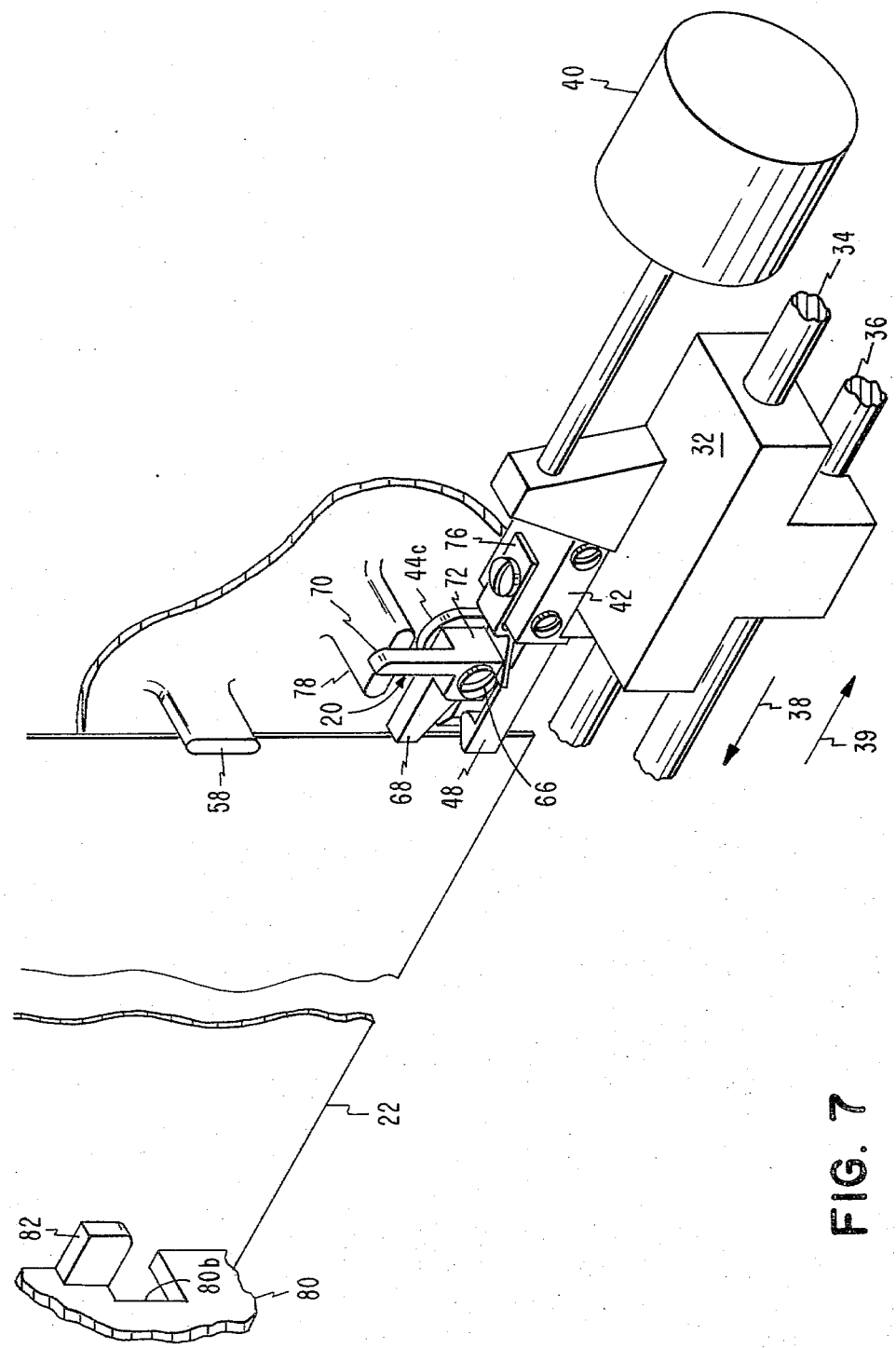
FIG. 7 is an isometric view of the gripper, the blocker and associated mechanism.

Referring to FIGS. 6 and 7 in particular, it will be observed that the rigid arm 44 is provided with an upstanding lug portion 44c; and the blocker 20 is pivotally mounted on the arm 44 by means of a shoulder screw 66 extending through the lug portion 44c and blocker 20. The blocker 20 comprises a pair of arms 68 and 70 disposed at right angles with respect to each other as seen in elevation (see FIG. 4, for example). It will be apparent from FIGS. 3 and 7 in particular that the arms 68 and 70 are out of line with respect to each other along the screw 66; that is, the arms 68 and 70 are in different spaced planes at right angles to the screw 66. The blocker 20 is provided with flat bottom surfaces 72 and 74 (see FIG. 4, in particular) which are respectively at right angles to the arms 68 and 70. A leaf spring 76 is fixed to the upper surface of the base 42 and extends below the surfaces 72 and 74 depending on the rotative position of the blocker 20 so that the leaf spring coacts with the surfaces 72 and 74 to provide a detent action on the blocker 20 in two different rotative positions of the blocker 20.

A fixed blocker restore boss 78 is disposed in the path of movement of the arm 68 as it moves with the blocker 20 in direction 39 after separating from a diskette 22 in contact with the stop 58. It will be observed with FIGS. 3 and 7 that the boss 78 is long enough to overlie the arm 68 but is not long enough to overlie the arm 70 so that the boss 78 can have no effect on the arm 70.

A fixed bezel 80 having a protruding wear surface 80a that is in close proximity to a diskette 22 in the magazine 28 and having an opening 80b therethrough through which the gripper 18 may pass is provided adjacent the open end of the magazine 28 (see FIGS. 1 and 7). The bezel 80 has a boss 82 formed thereon, and the boss 82 is in alignment with the arm 70 (but does not have sufficient width to align with the arm 68) so that the boss 82 is effective on the arm 70 as the gripper 18 moves in direction 38, just prior to moving through the opening 80b into the magazine 28.

The tip portion 48 of the arm 46 and the rigid arm 44 are provided on their ends with opposite cam surfaces 44X and 48X which diverge outwardly toward the ends of the tip portion 48 and arm 44 and which form a throat 84 into which a diskette 22 may move. When the diskette 22 is thus in the gripper 18, the tip portion 48 and the opposite distal portion 44y of the rigid arm 44 constitute opposite clamp jaw portions frictionally engaging the diskette 22 due to the resiliency of the arm 46 urging these clamp jaw portions together. The blocker arm 68 when in its position in which the arm 68 is in contact with the upper edge of the arm 44 extends substantially to the distal ends of the tip portion 48 and arm 44 so as to completely block the throat 84 and prevent a diskette 22 from entering the throat 84. The cam surfaces 48x and 44x may be somewhat out of alignment with each other (although the ends of the tip 48 and arm 44 are preferably directly opposite each other) as is taught by the co-pending Beuch et al application, Ser. No. 888,601, filed Mar. 20, 1978 for the purposes set forth in this application.

In operation, the assembly of the gripper 18 and blocker 20 is moved by the motor 40 first in direction 38 for the purpose of gripping a diskette 22, then is moved in direction 39 to engage the diskette with the stop 58 and finally is moved back in direction 38 into its original position after data transfer has been completed with respect to the disk 26. The assembly of the gripper 18 and blocker 20 may initially be in a "picker rest" position as shown in FIG. 5, with the arm 68 lying down in contact with the rigid arm 44 and thus blocking the throat 84. The gripper 18 is then moved in direction 38 by motor 40 so as to move the arms 44 and 46 through the opening 80b toward one of the diskettes 22 in the magazine 28. The magazine 28 is positioned at the time so that this diskette 22 is in alignment with the throat 84 of the gripper 18 (with one side surface of the diskette 22 being in alignment with the arm surface 44b). The boss 82 is in contact with the arm 70 in the picker rest position of the gripper 18 as shown in FIG. 5, and movement of the gripper 18 in the direction 38 causes boss 82 to swing the blocker 20 about the screw 66 against the yielding action of the spring 76 which tends initially to lie adjacent and along the surface 74 as shown in FIG. 5. The blocker 20 is swung for substantially 90° so that the arm 68 is out of alignment with the throat 84 and so that the blocker surface 72 is in full contact with the spring 76 (see FIG. 2). The boss portion 49 as shown in FIG. 6 initially holds the tip portion 48 at a certain minimum spacing with respect to the rigid arm 44; and, as the gripper 18 moves in direction 38 from its FIG. 5 position, the diskette 22 in alignment with the throat 84 contacts the cam surfaces 48x and 44x and further spreads the tip portion 48 away from the arm 44. The diskette 22 is held from any movement in direction 38 at this time by the closed rear end of the magazine 28. The diskette is thereby gripped between the tip portion 48 and the arm 44 in a clothes-pin like action, with the tip portion 48 and arm portion 44y embracing the diskette 22 and gripping it due to the spring action of the arm 46 in being stressed away from the surface 44b of the arm 44 by the diskette 22 between the arms 44 and 46. With the gripper 18 being fully engaged with the diskette 22, the gripper 18 is in a so-called "picker extend" position shown in FIG. 2, and the arm 68 is out of engagement with the diskette 22 as shown in this figure. In this "picker extend" position, the edge of the jacket 24 is preferably spaced from the boss portion 49 by a small distance, such as one millimeter (the length of the arm 44 from the boss portion 49 to its end may be, for example, 13 millimeters).

The motor 40 is then effective to draw the carriage 32 and the gripper 18 along with the blocker 20 in the direction 39. The gripper 18 grips the diskette 22 and pulls the diskette 22 in the slot 52 until finally the diskette 22 is blocked in further movement in this direction by the stop 58 (see FIG. 4). The diskette in this position preferably has a trailing portion still remaining in the magazine 28 and in its original locating grooves in the magazine 28. Continued movement of the gripper 18 in the direction 39 under action by the motor 40 causes the arms 44 and 46 to be stipped off of the diskette 22, and the arm 46 moves back into contact with the boss portion 49 due to its inherent resilience. Arm 68 contacts the boss 78 so that, with this continued movement, the boss 78 turns the blocker 20 into its FIG. 4 position in which the arm 68 is in contact with the rigid arm 44 and blocks the throat 84. This swinging movement of the blocker 20 is against the action of the spring 76 to move the blocker surface 72 out of contact with the spring 76 and to move the blocker surface 74 into near contact with the spring 76. The spring 76 then acts as a detent to hold the blocker 20 in this position in which the arm 68 overlies and blocks the throat 84. The motor 40 is then deactivated. Data transfer then occurs with respect to the disk 26, with data transfer being provided by conventional transducers acting through the elongate slots 24b on the disk 26. During this data transfer, the spindle 60 drives the disk 26, and the collet 62 clamps the disk 26 on the spindle 60.

After data transfer has been completed, the motor 40 is activated so as to move the carriage 32, gripper 18 and the blocker 20 in the direction 38. The arm 68 remains in contact with the rigid arm 44, with the arm 68 blocking the throat 84; and, on this movement, the end of the blocker arm 68 contacts the diskette 22 and moves the diskette 22 in the direction 38 out of contact with the stop 58. The blocker arm 68 continues to press against the edge of the diskette 22 and with continued movement of the parts in this direction moves the diskette 22 through the slot 52 and farther back into the magazine 28. This movement of the carriage 32, gripper 18 and blocker 20 is continued until the gripper 18 and blocker 20 are in their "picker rest" positions as shown in FIG. 5. At this time, the diskette 22 has been moved fully into the magazine 28; and the ends of the blocker arm 68, the tip 48 and the rigid arm 44 are just shy of the surface of the boss portion 80a of the bezel 80 that is most adjacent the edge of the diskette 22 now fully positioned in the magazine 28. The gripper 18 and blocker 20 then remain in their "picker rest" positions as shown in FIG. 5, while the magazine 28 is moved in direction 30 to position still another diskette 22 into alignment with the throat 84 for processing.

The blocker 20 advantageously reduces the wear on the diskette jacket 24 by one-half in comparison with the use of the gripper 18 alone (without blocker 20) which would not only embrace and slide over the jacket 24 for pulling the diskette 22 out of the magazine 28 but also would embrace and slide over the jacket 24 in returning the diskette 22 back into in the magazine 28. There is no substantial wear on the edge of the jacket 24 by the end of the blocker arm 68 in pushing the diskette 22 back in direction 38 into its original position in the magazine 28.

As another advantage, it is not necessary to move the gripper 18 through the opening 80b into the magazine 28 in returning a diskette 22 back into its original position in the magazine 28; and the blocker 20 thus effectively reduces the cycle time and movement of the carriage 32 and gripper 18. It is only necessary to move the gripper 18 into "picker rest" position shown in FIG. 5 in returning the diskette 22 into its original position in the magazine 28, and there is a slight clearance between the edge of the jacket 24 and the wear surface 80b of the bezel 80 in the original position of a diskette 22. The ends of the arms 44 and 46 and blocker arm 68 are slightly behind or to the right of the wear surface 80b as seen in FIG. 5, so that the magazine 28 may be moved in direction 30 without interference between any of diskettes 22, the arms 44 and 46, and blocker 20. In addition, the use of the blocker 20 effectively reduces the number of parts in order to make an operative structure, since no holding mechanism and motor therefor need be provided for holding a diskette 22 in its position in the magazine 28 when the gripper 18 is moved back out of the magazine 28 after having moved the diskette 22 back into its original position in the magazine 28. Since these additional parts are not required, their adjustment likewise is not required in assembling the machine.

We claim:

1. A gripper assembly including:
   a pair of clamp jaw portions movable toward and away from each other and resilient means urging said jaw portions together whereby they may be moved onto an article to embrace and frictionally grip the article between them, and
   a blocker movable with respect to said jaw portions blocking entrance of an article between said jaw portions in one position of the blocker and allowing such entry of an article between said jaw portions in another position of the blocker.

2. A gripper assembly as set forth in claim 1 and including a carriage carrying said jaw portions, said jaw portions having outwardly diverging cam surfaces on their ends remote from said carriage forming a gripper throat so that said jaw portions may be cammed across an edge of the article and onto the article in embracing relationship therewith with movement of said carriage toward said edge.

3. A gripper assembly as set forth in claim 2, one of said jaw portions constituting a part of an arm of rigid material fixed to said carriage and said resilient means constituting a second arm of resilient sheet material fixed to said carriage and having said other jaw portion fixed to it on its end remote from said carriage.

4. A gripper assembly as set forth in claim 2, said blocker being rotatably mounted with respect to one of said jaw portions and blocking said gripper throat in one position while unblocking the throat in the other of its positions.

5. A gripper assembly as set forth in claim 2, one of said jaw portions constituting a part of an arm of a rigid material fixed with respect to said carriage and said resilient means constituting an arm of resilient sheet material fixed with respect to said carriage and having the other of said jaw portions fixed to it on its end remote from said carriage, said blocker being rotatably mounted on said rigid arm and the gripper assembly including spring detent means for yieldably holding said blocker in both its blocking and unblocking positions with respect to said throat.

6. Mechanism for gripping an article and moving it in a first direction from an original position to a final position and then back from said final position to its said original position in a second opposite direction and including:
   a gripper having a pair of clamp jaw portions movable toward and away from each other and resilient means urging said jaw portions together whereby they may be moved onto the article to embrace and frictionally grip the article between them,
   means for moving said gripper in said first direction whereby the gripper is effective to pull the article from its original position to its final position and said means also being operative to move said gripper in the second opposite direction,
   a blocker carried by said gripper and having two positions in one of which it blocks entry of the article into the gripper and in the other of which it allows entry of the article into the gripper, and a fixed abutment for moving said blocker from its unblocking position to its blocking position on a continued movement of said gripper in said first direction subsequent to a movement by said gripper of the article into its final position whereby the blocker may be effective to abut said article and move the article back from its final position toward its original position on a movement of said gripper in the second opposite direction.

7. Article gripping and moving mechanism as set forth in claim 6 and including a second fixed abutment effective for moving said blocker from its blocking position to its unblocking position on a movement of said gripper in said second direction subsequent to a return of said article substantially to its said original position, said jaw portions being provided with outwardly diverging cam surfaces on their ends whereby said jaw portions may be cammed across an edge of an article in said original position to again embrace and frictionally grip an article in said original position with movement of said gripper in said second direction and with said blocker being in unblocking position.

8. In a method for moving an article in a first direction from an original position to a final position and then back from said final position to its said original position in a second opposite direction including the steps of:

utilizing a gripper including a pair of clamp jaw portions resiliently urged together and having outwardly diverging cam surfaces on adjacent ends of the two jaw portions to define a throat and moving the gripper in said second direction toward said article in its original position so that said jaw portions cam over an edge of the article and embrace and frictionally grip the article, then moving said gripper in said first direction so that said gripper pulls the article into its said final position, continuing the movement of said gripper in said first direction while holding the article from further movement in this direction out of its said final position so as to strip said gripper from the article, moving a blocker across said throat of said gripper, and then moving said gripper with said blocker across its said throat in said second direction so that the blocker abuts the article and moves the article from its said final position back to its said original position while blocking entrance of the article into said gripper.

9. A method for moving an article as set forth in claim 8 and including the further step of moving said blocker back into its position unblocking said throat with further movement of said gripper in said second direction after said blocker has been effective to move said article back into its original position so that said gripper may be subsequently effective to again grip an article in said original position with further movement of the gripper in said second direction with said jaw portions camming over an edge of said last named article in order to move into an embracing and frictionally engaging relationship with said last named article.

* * * * *